Patented Dec. 3, 1935

2,022,766

UNITED STATES PATENT OFFICE 2,022,766

CHEMICAL COMPOSITION

Benjamin R. Harris, Chicago, Ill.

No Drawing. Application November 10, 1933,
Serial No. 697,533

21 Claims. (Cl. 252—6)

My invention relates to new chemical compositions and methods of producing the same.

My present invention is a continuation in part of my prior application Serial No. 431,964, filed February 27, 1930.

In many of the arts, there is a demand or need for materials having in general an oleaginous or fatty character but as well certain characteristics not ordinarily associated with fats. These characteristics may, in general, be summed up in the term "hydrophyllic property". This hydrophyllic property, however, is merely a broad generalization, as in different cases the characteristic is identified with the particular object or function desired in the art or industry.

The principal object of the present invention is the provision of a new composition of matter adapted for use in various arts.

Another object is the provision of a process for producing such materials.

The materials of my invention are in general esters of polyglycerols and relatively high molecular weight fatty acids with free OH groups. In the preferred practical form of the invention, the material is a mixture of various chemical compounds, all having oleaginous and aqueous properties imparted to them by the character of groups present in the molecule. The lipophile group may be modified but the hydrophile group is an OH group and through the number of the OH groups definite hydrophyllic character is present. The material is, in general, a mixture of various polyglycerides with or without the presence of some portions of mono-glycerides in the form of mono- or di-esters. Further consideration of the character of the material will be shown from the following description in which the method of making the materials is set out.

In the preferred form of producing my materials, I first produce the poly-glycerols by the treatment of glycerine with a small amount of alkali under suitable conditions. As an example, I take 10 pounds of glycerine containing practically no water or as little water as possible, and heat the same with $\frac{1}{10}$ of a pound of sodium hydroxide. The temperature is brought up to about 260° C., and heating is continued for about four and one-half hours, preferably in a non-oxidizing atmosphere. I preferably bubble carbon dioxide or some other inert gas through the glycerine while raising the temperature and preferably before the introduction of the sodium hydroxide.

During the prolonged heating, the water formed as a reaction product boils off with small portions of glycerine. The result of the process is the formation of polyglycerols. In the particular manner in which I control the process, a mixture of various polyglycerols is obtained. It should be noted that the higher the temperature employed, the longer the heating period, and the stronger the alkali, the greater will be the degree of polymerization. The reverse is true as well. For my purpose, the degree of polymerization obtained in the example given is very satisfactory. It will be understood that even in my preferred process, other forms of alkali may be used in place of the sodium hydroxide. As an example, I have produced very good results by the use of potassium hydroxide, magnesium oxide, sodium carbonate, sodium acetate, and other equivalents. In each case, however, some modification, either in time of treatment, temperature, or amount of alkali, is necessary to obtain comparative results.

In further steps of the process, the mixture of poly-glycerols is reacted under suitable conditions with higher fatty acids to produce the mixture of esters preferred in my product. In general, I employ an excess of the polyglycerols in order to obtain a final product having the desired suitable hydrophyllic character. As a source of fatty acids, I may employ substantially any of the usual fats and oils of commerce. The character of the final product is best understood by a consideration of some examples for producing the same.

Example 1

I take 675 parts of coconut oil, 800 parts of polyglycerol prepared as above, and .675 pound of caustic soda employed as a catalyst. The materials are mixed together and heated with continued stirring until a temperature of about 250° C. is attained. The materials are retained at this temperature and constantly stirred for approximately two hours, preferably in the absence of air. As in the above described method of producing the polyglycerols, air may be replaced with an inert gas and this is readily accomplished by bubbling, for example, carbon dioxide or nitrogen through the mixture. The resulting product is then cooled and is found to be a thick, heavy viscous mass having pronounced fatty characteristics insofar as its ordinary appearance and behavior is concerned. It has a pronounced aqueous character, however, in that it is miscible with or dispersible in water in substantially all proportions. Investigation shows that the product is a mixture which contains a very large proportion of mixed polyglycerol esters with free OH groups. If desired, the composition may be neutralized or even rendered slightly acid and it will still be freely dispersible in water. Its behavior, however, will be slightly modified by the neutralizing treatment, the amount of modification depending upon how much acid is added to it.

*Example 2*

I take 300 pounds of neat's foot oil, and mix the same with 300 pounds of polyglycerol prepared as above, and 3/10 of a pound of caustic soda. The mixture is heated for three hours at a temperature of approximately 260 to 265° C. in the absence of air and preferably using the technique set out in connection with Example 1. The material is allowed to settle after cooling and the excess of polyglycerol found to be present is drawn off. The resulting product is a thick, viscous dark brown oil which, however, emulsifies very readily with water.

*Example 3*

300 pounds of corn oil is heated with 300 pounds of polyglycerol prepared as above at approximately 265° C. in the presence of 3/10 of a pound of caustic soda. The same technique may be employed as in preceding examples and, as in Example 2, the unreacted portion of polyglycerol is drawn off. The resulting product is a viscous dark brown oily liquid readily emulsifiable with water.

*Example 4*

540 pounds of prime leaf lard is mixed with 640 pounds of polyglycerols prepared as described, and 54/100 pound of caustic soda added thereto. The mixture is heated to approximately 260° C. and maintained at this temperature for approximately three hours. A non-oxidizing atmosphere is maintained and the material is stirred constantly during heating. After cooling, the excess of polyglycerol is drawn off. The resulting product is a lard-like fatty composition which, however, is readily dispersible in water and/or other aqueous medium.

*Example 5*

In place of carrying out the step of polymerizing the glycerine completely before employing the second step of the process, I may continue to carry on the polymerizing step in conjunction with esterification as it occurs in the second step of the process. As an example, I take 3¼ parts of sodium hydroxide (flaked) and dissolve the same in 325 parts of glycerine (95%). The solution is heated in a non-oxidizing atmosphere to 260° C. This requires some time because of the water originally present which has to boil off, and also because of the water of reaction which must also be expelled. After the temperature is reached, I continue to heat with constant stirring for about two and one-half hours. At this time, 400 pounds of melted oleostearine and 4/10 part of caustic soda are added. Heating is continued in an inert atmosphere at a temperature between 240° and 250° C. The mixture becomes homogeneous approximately in this temperature range. This temperature is maintained for about one and one-half hours or more, and the mass is then cooled while maintaining a non-oxidizing atmosphere. The product comprises a mixture of polyglycerol esters possessing available colloidal properties, but differing somewhat from products produced in preceding examples.

In place of triglycerides and the like, I may employ higher molecular weight fatty acids directly. This will produce a product with somewhat different characteristics. For example, I may produce a stearic acid ester of mixed polyglycerols as follows: 1400 parts of anhydrous glycerol and 30 parts of fused sodium acetate are mixed and heated at 275° C. in a non-oxidizing atmosphere for five hours. 930 parts of this reaction mixture are then treated with 150 parts of stearic acid and heated with continuous agitation for sixteen hours at between 190 to 200° C. The product is a tacky solid of a dark color and readily emulsifiable in water. It is to be noted that in this example, a catalyst is not employed to hasten the reaction between the polyglycerols and the fatty reacting material. The above example can be modified in many respects. For instance, the time of heating may vary and, of course, other catalysts may be used instead of sodium acetate.

I have given examples in which polymerization of the glycerine is substantially completed before re-esterification, and at least one example in which some polymerization and re-esterification are carried on together. I may as an alternative carry out the polymerization and re-esterification by mixing glycerine and the oil or fat together with a catalyst, and heat the mixture with constant stirring. An excess of glycerine is desirable in this case, and prolonged heating is advisable. The final product, however, will differ from those of the preceding examples, although it will be hydrophyllic and contain a mixture of polyglycerides with free OH groups.

I have given several examples above of the manner of producing my new composition, all employing a natural oil or fat of commerce, whether hydrogenated, partially hydrogenated, or unhydrogenated. The material reacted with the polyglycerols, however, instead of being a triglyceride may also be a mono- or di-glyceride. In fact, substantially any wax, fat, or fatty acid, whether occurring naturally or synthetically produced, can be used as the reacting substance.

The materials produced in accordance with my invention may be compared with substances produced heretofore by sulfonation. It is well known that various fats and oils by sulfonation processes have been made more or less dispersible in water. The sulfonation products, however, are not at all suited for all purposes. The products of my invention are in many respects exceedingly more oily or fatty in character than corresponding substances produced by sulfonation and having substantially the same fat radical. In general they disperse much more readily in water than the products of the prior art referred to. In other words, the substances of my invention may be considered forms of soluble oil. They may be employed to enhance the stability of emulsions, are of value in some arts as wetting agents, can be used as detergents, and in general have a function in many arts in which this general type of material has been used in the past.

In the process of producing my materials, proportions, temperatures, and other factors may be modified to vary the characteristics of the final product. When a tri-glyceride is used such as coconut oil, the amount of polyglycerol esters formed depends upon the proportion of the polyglycerols used in the reaction. If a small amount of polyglycerol is used, a mixture of the mono- and di-glycerides of the fatty acids together with a mixture of the mono- and di-fatty acid polyglycerol esters is obtained. If a larger proportion of polyglycerol is used, it will replace substantially all of the glycerine esterified in the fatty substances. My invention includes either type of material. The composition may be used in the form produced, may be purified, neutralized, or treated in any way which does not affect its desired characteristics. Where free glycerine is produced in re-esterification of a fat or oil, it may be removed, or where there is no objection to its presence, it may be allowed to remain in the composition.

I may use my products directly, or purify them to modify or improve the odor, color, or taste, or remove impurities, such as unreacted glycerine or the like by dispersing in hot water and then throwing the substances out of dispersion by neutral or acid electrolytes.

As an illustration of this method of treating my products; I disperse 200 parts of the product obtained in Example No. 4 in 1000 parts of hot water by warming and stirring until a homogeneous dispersion is obtained. I then stir in about 50 parts of common salt and allow the mixture to remain at rest until two layers are obtained. The lower layer, that is the brine layer, with dissolved impurities, may be drawn off and what remains is the purified polyglycerol ester with an appreciable content of water varying between 30 and 50%, depending upon conditions. The water, if desired, may be boiled off, evaporated off under vacuum, or otherwise separated from the polyglycerol ester. The recovered emulsion in the form of a paste, however, may be employed directly and with some advantage in most of the arts in which my material has a use.

For certain purposes where an extremely pure product is desired, the washing step may be repeated several times, if desired, to remove all traces of objectionable impurities.

I have previously referred in general to the uses of my materials. They have a place in the arts relating to emulsifying, detergents and lubricating compounds. On account of their high emulsifying value, they can be used advantageously in the preparation of various cosmetics and hand lotions. They also may be used for wetting or lubricating fibrous materials. They can be employed in place of Turkey red oils of commerce for substantially any purpose for which Turkey red oils are used, for example, stuffing leather. They can be used with insecticide sprays as emulsifying assistants. They can be used in paints to reduce the settling of lakes and pigments. They may be used as assistants in laundering. They may be added to soap or other detergent materials. They may be used in connection with compounded lubricating oil emulsions. In all of these uses, they may be employed alone or with alkaline substances, either as a necessary part of a composition or as a dispersing agent.

As an example of the use of the material of my invention, I give below a formula for vanishing cream.

| | Grams |
|---|---|
| Rose water | 1400 |
| Glycerine | 250 |
| Stearic acid | 120 |
| Potassium hydroxide | 12 |
| Polyglycerol fatty acid ester of Example 4 | 60 |

In the conventional formula of which the above is a modification, approximately 300 grams of glycerine would customarily be used. The character of my material makes it possible to decrease the amount of glycerine, this being due in part to the fact that the material when not purified will contain some free glycerine. In compounding the vanishing cream, the ingredients are warmed and agitated together in a stirring apparatus or colloid mill. The material of my invention preferably is incorporated after the formation of the emulsion. Other accessory ingredients such as whitening agents, perfume, and the like can, of course, be added. The finished product will have a good texture, greater resistance to syneresis and excellent spreading value.

In making a cosmetic cold cream, I may employ the following formula:

| | |
|---|---|
| Stearic acid | 1000 grams |
| Lard | 150 grams |
| Polyglycerol fatty acid ester of Example 4 | 50 grams |
| Ammonia water | 100 cc. |
| Distilled water | 7700 cc. |

The usual auxiliary ingredients such as perfume and the like may be added to the formula. The emulsion is made in a suitable way at a temperature somewhat above room temperature. The resulting product is superior to usual creams of commerce in most respects for which this type of material is used.

Still other examples of emulsions employing my materials are as follows:

*Furniture polish*

| | Parts |
|---|---|
| Carnauba wax | 10 |
| Paraffin | 10 |
| Ceresin | 5 |
| Kerosene | 20 |
| Water | 50 |
| Mixed coconut fatty acids polyglycerides of Example 3 | 10 |

*Shoe and leather polish*

| | Parts |
|---|---|
| Carnauba wax | 11 |
| Turpentine | 7 |
| Water | 67 |
| Lard polyglyceride of Example 4 | 10 |

This preparation may have coloring material added, if desired.

*Kerosene emulsion*

| | Parts |
|---|---|
| Soap | 4 |
| Water | 100 |
| Kerosene | 90 |
| Mixed polyglycerides of Example 2 | 10 |

An emulsion of this character may have many uses in various arts.

Various other emulsions are improved by the incorporation of the materials of my invention, such as shaving and cleaning preparations, insecticides, medicines, germicides, and the like. Cosmetic preparations such as lipsticks and rouges can be improved by employing my materials. They may be used, for example, after the manner disclosed in my prior application, Serial No. 407,797, filed November 16, 1929, now Patent No. 1,958,700, and of which the present application is a continuation in part.

The above emulsions are purely by way of example, as many other formulas may be used in the cosmetic and other arts in which the material of my invention may be employed either as an emulsifying agent alone, to replace some of the fatty material ordinarily used in the emulsion, or in other ways which are obvious from the preceding description.

What I claim as new and desire to protect by Letters Patent of the United States is:

1. A chemical composition comprising an ester of a polyglycerol and a relatively high molecular weight of fatty acid, said ester having free OH groups.

2. A chemical composition comprising esters of mixed polyglycerols and a relatively high molecular weight fatty acid, said esters having free OH groups.

3. A chemical composition comprising esters of mixed polyglycerols and mixed relatively high molecular weight fatty acids, said esters having free OH groups.

4. A chemical composition comprising a reaction product of a mixture of polyglycerols and a triglyceride, wherein glycerine is replaced in part or in whole by a polyglycerol, said reaction product having free OH groups.

5. A chemical composition comprising a reaction product of a mixture of polyglycerols and a triglyceride, including fatty acid esters of glycerine with free OH groups.

6. A chemical composition comprising a reaction product of a mixture of polyglycerols and a naturally occurring oleaginous substance of a class consisting of oils, fats and waxes, said reaction product having free OH groups.

7. A chemical composition comprising a mixture of glycerides and polyglycerides formed by reacting a mixture of polyglycerols with a naturally occurring liquid oil having a fatty acid radical, the product of said composition having free OH groups.

8. A chemical composition comprising a mixture of glycerides and polyglycerides formed by reacting a polyglycerol and coconut oil, the product of said composition having free OH groups.

9. The method of producing a new chemical composition which comprises producing a mixture of polyglycerols by polymerization of glycerine in a non-oxidizing atmosphere, and reacting said polyglycerols with an oleaginous material having a reactive lipophile radical to produce a mixture of polyglycerides having free OH groups.

10. The method of producing a new chemical composition which comprises mixing polyglycerols with a material having an esterifiable fatty acid radical in the presence of a relatively small amount of alkali as a catalyst, and heating the mixture to react the polyglycerols and fatty material and form a mixture of polyglycerides having free OH groups.

11. The method of producing a new chemical composition which comprises mixing an excess of polyglycerol with a fatty material having an esterified fatty acid radical, and heating the mixture to cause a reaction and produce a fatty acid ester of polyglycerol having free OH groups.

12. The method of producing a new chemical composition which comprises mixing an excess of the polyglycerol with a fatty material having an esterified fatty acid radical, and heating the mixture in the presence of a relatively small amount of alkali to cause a reaction and produce a fatty acid ester of polyglycerol having free OH groups.

13. The method of producing a new chemical composition which comprises mixing an excess of the polyglycerol with a fatty material having an esterified fatty acid radical, heating the mixture to cause a reaction and produce a fatty acid ester of polyglycerol having free OH groups, and washing the resulting material in brine to remove impurities therefrom.

14. An emulsion of an aqueous liquid and a fatty acid ester of polyglycerol with free OH groups.

15. An emulsion of an aqueous liquid and a mixture of fatty acid esters of polyglycerols with free OH groups.

16. An emulsion of oleaginous material, an aqueous liquid and a proportion of a fatty acid ester of polyglycerol with free OH groups.

17. An emulsion of oleaginous material, an aqueous liquid, and a proportion of a mixture of fatty acid esters of polyglycerols with free OH groups.

18. An emulsion comprising an aqueous liquid, an oleaginous material, and a reaction product of a mixture of polyglycerols and a triglyceride, said reaction product having free OH groups.

19. An emulsion comprising an aqueous liquid, an oleaginous material, an alkaline substance, and a reaction product of a mixture of polyglycerols and a triglyceride, said reaction product having free OH groups.

20. The method of producing an improved hydrophyllic chemical composition which comprises adding about 1% of a relatively strong alkali to glycerine and heating the mixture at a temperature of approximately 260° C. for at least four hours until a highly polymerized product is produced, mixing the polymerized product with an oleaginous substance of a class consisting of oils, fats, waxes and fatty acids, and heating the mixture to cause re-esterification of fatty acids of the oleaginous material with the highly polymerized glycerine, whereby polyglycerides having free OH groups are produced.

21. A chemical composition comprising a fatty acid ester of a polyglycerol, said ester having at least one free OH group.

BENJAMIN R. HARRIS.

DISCLAIMER 2,022,766.—*Benjamin R. Harris*, Chicago, Ill. CHEMICAL COMPOSITION. Patent dated December 3, 1935. Disclaimer filed January 7, 1939, by the assignee, *The Emulsol Corporation*.

Hereby enters this disclaimer to claims 1 and 21 in said specification.

[*Official Gazette February 28, 1939.*]

DISCLAIMER 2,022,766.—*Benjamin R. Harris*, Chicago, Ill. CHEMICAL COMPOSITION. Patent dated December 3, 1935. Disclaimer filed January 7, 1939, by the assignee, *The Emulsol Corporation*.

Hereby enters this disclaimer to claims 1 and 21 in said specification.

[*Official Gazette February 28, 1939.*]